March 19, 1935.   W. B. HANFORD ET AL   1,995,061
TESTING MACHINE
Filed April 4, 1930   2 Sheets-Sheet 1

INVENTORS
William B. Hanford
Edward B. Erickson
Walter L. Pipes
ATTORNEY

March 19, 1935. W. B. HANFORD ET AL 1,995,061

TESTING MACHINE

Filed April 4, 1930 2 Sheets-Sheet 2

INVENTORS
William B. Hanford
Edward B. Erickson
Walter L. Piper
ATTORNEY

Patented Mar. 19, 1935

1,995,061

UNITED STATES PATENT OFFICE 1,995,061

TESTING MACHINE

William B. Hanford and Edward B. Erickson, Detroit, Mich., assignors, by mesne assignments, to United States Rubber Company, New York, N. Y., a corporation of New Jersey Application April 4, 1930, Serial No. 441,444

12 Claims. (Cl. 73—51)

This invention relates to a testing machine, and more particularly to a testing machine adapted to determine the degree of static unbalance of articles such as tire casings and/or tubes and similar articles.

Tire casings and/or tubes as constructed according to present practices are intended to be in a condition of static balance with regard to the geometrical center of the casing and/or tube. Due to practical considerations in the manufacture of such articles they usually have a slight degree of static unbalance.

It is the object of this invention to provide a testing machine for measuring the degree of static unbalance. It is also the object of this invention to measure the static unbalance in terms of torque. It is the object of this invention to provide a tire testing machine for determining the static unbalance therein which is simple to operate, can be used with any size of casing and which is simple in construction and accurate in operation. Other objects and advantages of the present invention will appear in the following detailed description taken in connection with the accompanying drawings in which:

In the practice of this invention use is made of the principle that when an article which is in static unbalance about its geometrical center is mounted for free rotation in a vertical plane, it tends to assume a position with its heavier part lowermost. Accordingly a support which conveniently takes the form of the drum 1 is provided upon which the tire casing and/or tube or similar article 2 may be positioned conveniently. The supporting means or drum 1 is in static balance with respect to its geometrical center and the particular structural form of the drum is determined only by the convenience of the operator in using the device in connection with tire casings and/or tubes or the like. In this particular instance the drum construction provided with the flange 3 is most convenient for mounting a tire casing thereon. The supporting means or drum 1 is mounted for free rotation in a vertical or nearly vertical plane.

Figure 1:
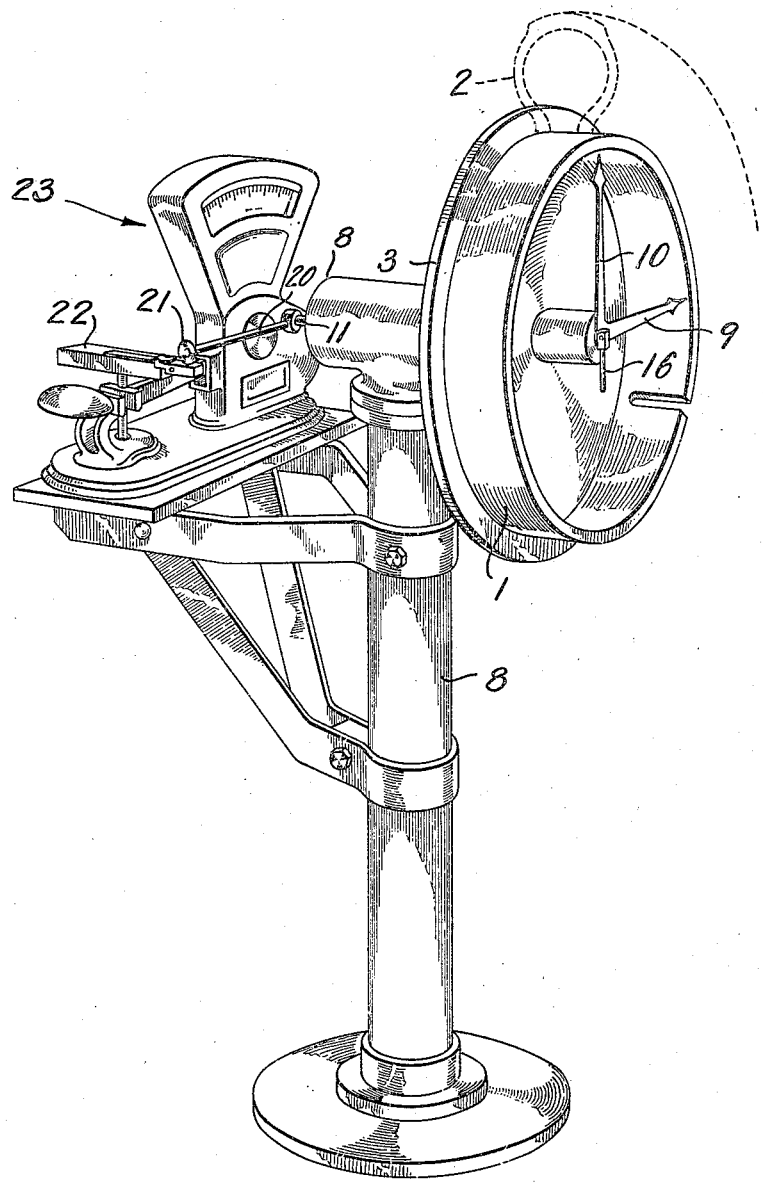
Fig. 1 is a perspective view of the machine of this invention.

For supporting the drum 1 in free rotation in a substantially vertical plane, a hub 4 is secured to the drum 1 in any suitable manner as by means of the screws 5. The hub 4 is mounted for free rotation on suitable bearings 6, the stationary parts of which are suitably secured to a tubular axle 7. The axle 7 is rigidly fixed in a frame 8 of any construction satisfactory for the uses to which the invention is put. The axle 7 may be fixed in the support 8 in any desired manner as by a drive fit or it may be made integral with the frame 8. When the tire and/or tube or similar article is mounted upon the drum 1 as shown in dotted lines in Fig. 1 and allowed to adjust itself the drum will turn in free rotation until the heaviest part of the article will assume the lowermost position.

In order to determine the degree of static unbalance of the article with respect to its center, the drum 1 and the article carried thereon are turned about the axle 7 so as to bring the article into an unstable position where the force of gravity will act upon the article and tend to cause it to return to the position in which its heaviest part is lowermost. Measuring mechanism associated with the drum 1 is then set into operation to respond to the torque due to the unstable position of the article and thereby to measure or otherwise show the degree of unbalance of the article. Inasmuch as the torque due to the unstable position of the tire is directly proportional to the sine of the angle through which the article has been rotated from its stable to its unstable position, it is necessary to fix upon a predetermined position of unstable adjustment in order that successive tests may be comparable and that the instrument may be calibrated to read directly in terms of unbalance.

Means for indicating the predetermined settings of the article in unstable position may conveniently take the form of the double pointer 9 and 10 which is fixed in position against rotation in any suitable manner. The construction whereby the double pointer is held stationary will later be described. In the operation of the device the tire casing and/or tube or similar article is positioned on the drum 1 and allowed to assume the position in which the heaviest part of the article is lowermost. Then the article is marked, as with chalk for instance, adjacent the pointer 10. The drum 1 is then rotated until the mark on the article is brought adjacent the end of the pointer 9, thus positioning the article in a predetermined unstable condition. Obviously the angle between the pointers 9 and 10 may be of any size other than 180° or multiples thereof. Furthermore it is obvious that the double pointer 9 and 10 may be positioned in any azimuth. The function of the double pointer 9 and 10 is to predetermine the angle through which the tire casing and/or tube or like article is rotated from stable to unstable position and the function of the double pointer 9 or 10 in this respect is independent of the particular angle between the pointers 9 and 10 and their particular position in azimuth as pointed out.

While the tire casing or like article is in unstable position the torque due to its unstable position is measured to determine the degree of unbalance of the tire or like article. To effect such a measurement it is necessary only to provide a motion transmitting mechanism between the drum 1 for transmitting the torque to a force measuring machine.

A highly satisfactory mechanism for effecting the measurement of the torque can take the form of a spindle 11 mounted for rotation or oscillation in bearings 12 carried by the axle 7 and the frame 8. The spindle 11 is provided with a shoulder 13 on which rests a collar or washer 14. The extremity of the spindle 11 is keyed and the double pointer 9 and 10 fits thereon. A washer 15 overlays the double pointer 9 and 10 on the keyed extremity of the spindle 11. A hand lever 16 provided with cams 17 is pinned for rotation on the extremity of the spindle 11. A cap 18 is screwed or otherwise fixed onto the hub 4 and is provided with an aperture 19 through which the spindle 11 passes. The margins around the aperture 19 are engaged by the washer 14 and by the hub of the double pointer 9 and 10, or alternatively by the other washer 15. Upon manipulation of the hand lever 16 into the position shown in Fig. 2 the cams 17 act upon the washer 15 so that the margins of the cap 18 around the aperture 19 are clamped between the washer 14 and the hub of the double pointer 9 and 10 and washer 15 thereby fixing the spindle 11 to the drum 1 so that forces and motions of the drum are transmitted through the spindle 11. At the other extremity of the spindle 11 a crank arm 20 is fixed and extends at right angles thereto. The crank arm 20 carries a contact member 21 which conveniently is in the form of a disk which cooperates with the pan 22 of the force measuring machine 23.

When the tire and/or tube or similar article is adjusted to an unstable position and the spindle 11 is connected to the drum 1, the torque exerted due to the unstable position of the article is transmitted through the spindle 11 and crank arm 20 to the measuring machine. The force exerted on the pan of the force measuring machine 23 is determined by the degree of unbalance of the tire and/or tube or similar article, by the unstable position thereof, and by the length of the crank arm 20. By calibrating the force measuring machine 23 for a predetermined setting of unstable position of the article and also for a predetermined length of crank arm 20, the scale of the force measuring machine may be read directly in terms of the maximum torque exerted by the unbalanced condition of the tire and/or tube or similar article. Convenient units of torque are inch-ounces.

Figures 2, 3:
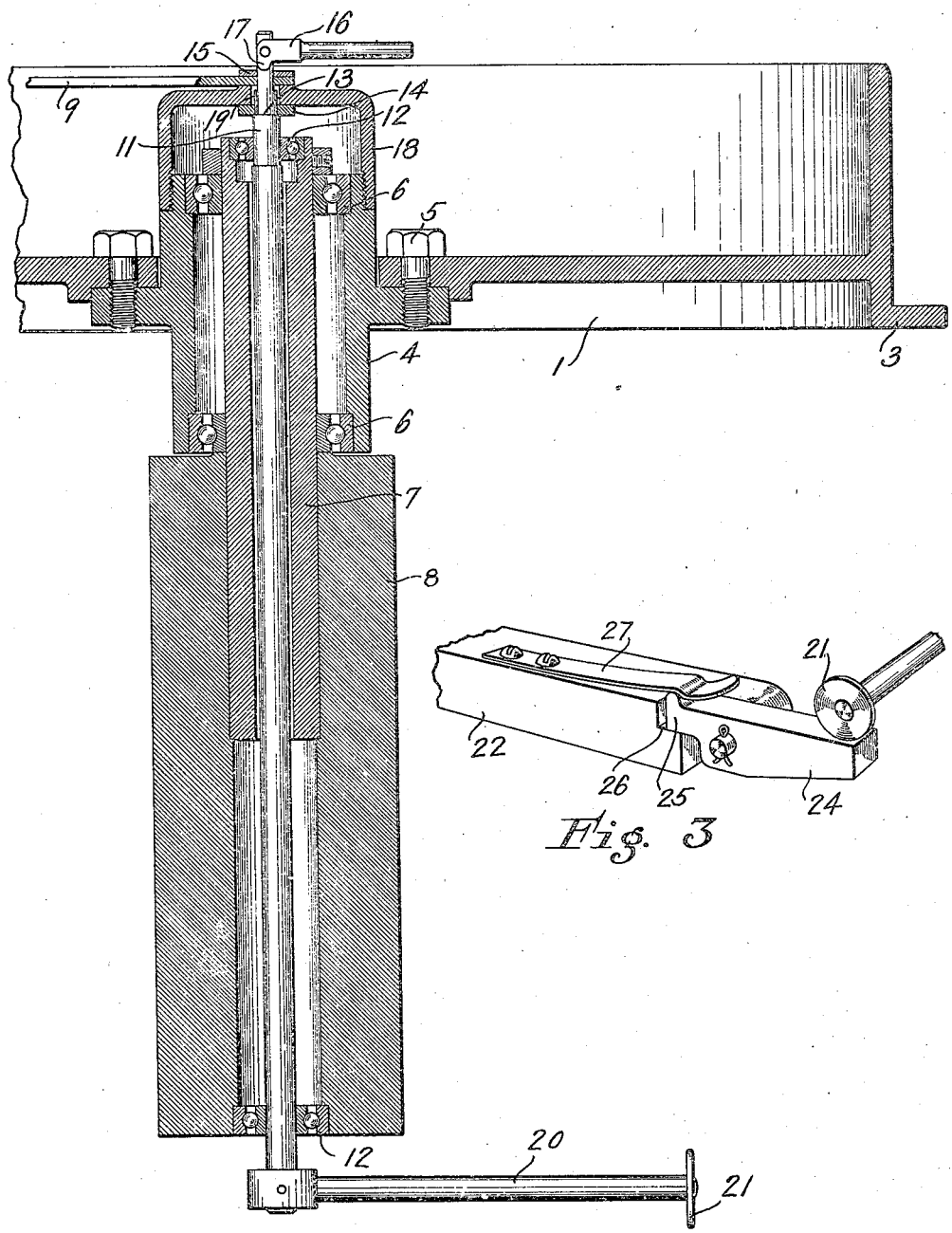
Fig. 2 is a cross sectional detail view taken along a plane through the axis of the drum support.
Fig. 3 is a detail view in perspective showing a safety device.

To prevent damage of the force measuring machine 23 a safety device as shown in Fig. 3 is provided which comprises an arm 24 pivotally mounted upon the pan 22 and having an extension 25 adapted to abut against a ledge 26 on the pan 22. A spring 27 fixed upon the pan 22 cooperates with the end 25 of the arm 24 to normally hold it in contact with the ledge 26. The contact member 21 of the crank arm 20 cooperates with the end of the arm 24 to transmit the force to the pan 22. If an excess force be applied against the arm 24 the spring 27 will flex so as to permit the arm 24 to rotate to such a position as to permit the contact member 21 to freely pass it. The arm 24 may then be adjusted back to normal position as shown in Fig. 3 manually.

While the invention has been described with particularity by way of illustration it is not intended so to limit the invention inasmuch as many variations in the details thereof may be made without departing from the principles and spirit of this invention, the scope of which is set forth in the following claims.

Having thus described our invention, what we claim and desire to protect by Letters Patent is:

1. A testing machine having means mounted for free rotation about its center of gravity in a plane substantially parallel to the direction of the gravity force, said means being constructed to carry a tire casing or similar article in substantially its intended manner of rotation, said means being adjustable to a position such that a condition of static unbalance in the tire casing or similar article will tend to cause rotation of the means, and a second means operable by the first means for showing the degree of unbalance of the tire casing or similar article, and pointers carried by said second means in co-axial alignment with and adjacent to said first means for direct cooperation therewith.

2. A testing machine having means for carrying a tire or like article with its intended plane of rotation substantially parallel to the direction of the gravity force, a support for the means on which the means is free to rotate in said plane so that a condition of unbalance in the tire casing or similar article will cause it to assume a position with its heavier part lowermost, and mechanism cooperating with the means operable when the tire casing or similar article is in an unstable position to show the degree of unbalance, said mechanism including a rotatable member extending through said means with its axis of rotation coinciding with the axis of rotation of said means.

3. A testing machine having a drum mounted for rotation about its center of gravity in substantially a vertical plane and adapted to carry a tire casing and/or tube on its periphery, said drum being normally free to rotate so that an unbalanced tire casing and/or tube will assume a position with its heaviest part lowermost, and a torque measuring device connectable with and operable by the drum when the tire casing and/or tube is in an unstable position so as to measure the degree of unbalance of the tire casing and/or tube, said device including rotatable members whose axis of rotation coincides with the axis of rotation of said drum, and extends through the drum.

4. A device for measuring the degree of unbalance of a tire casing and/or tube mounted for free rotation in a vertical plane comprising a hub for supporting the tire and/or tube, a rotatable spindle adapted to be mounted within said hub, means for indicating said degree of unbalance, and means cooperating with said hub, spindle and indicating means for transmitting to the spindle and indicating means the torque applied to said hub by the unbalanced tire casing and/or tube.

5. A balancing machine comprising a hollow shaft, a drum rotatably mounted upon said shaft, a spindle rotatably mounted in said shaft, a pointer carried by said shaft, and means for preventing relative rotation between said drum and said spindle.

6. A balancing machine comprising a hollow shaft, a drum having a hub portion rotatably mounted on said shaft, a cap member fixed to said hub portion and being provided with an opening, a spindle rotatably mounted in said shaft and extending thru said opening, and means engaging said cap member and spindle for locking said drum to said spindle.

7. A balancing machine comprising a hollow support, a drum having a hub portion rotatively mounted on said support, a cap member attached to said hub portion, a spindle rotatably mounted in said support, and means for locking said cap member to said spindle.

8. A balancing machine comprising a hollow support, a drum having a hub portion rotatably mounted on said support, a cap member attached to said hub portion and being provided with an opening, a spindle rotatably mounted in said support and extending thru said opening, an abutment on said spindle, and a cam pivotally mounted on said spindle, said cam and abutment cooperating to lock said drum to said spindle.

9. A balancing machine comprising a hollow support, a drum having a hub portion rotatively mounted on said support, a cap member attached to said hub portion and being provided with an opening, a spindle rotatably mounted in said support and extending thru said opening, a crank arm mounted on said spindle for engaging a force measuring device, an abutment on said spindle, and a lever pivotally mounted on said spindle, said lever carrying a cam operable to hold said cap against said abutment.

10. A safety device for force measuring machines provided with a force receiving member, comprising a contact member pivotally mounted upon the force receiving member, and a spring clip mounted on said force receiving member for engaging one end of said contact member, said clip permitting the contact member to turn to an inoperative position upon the application of an excessive force to the other end of said contact member.

11. A safety device for force measuring machines provided with a force receiving member, comprising a contact member pivotally mounted upon the force receiving member, an abutment on said force receiving member, and a spring clip mounted on said force receiving member adjacent said abutment for holding one end of said contact member against said abutment, said clip being adapted to release the said end of said contact member from the abutment upon the application of excessive force to the other end of said contact member.

12. A safety device for force measuring machines provided with a force receiving member, comprising a contact member pivotally mounted upon the force receiving member adjacent an edge thereof, an abutment on said force receiving member projecting beneath one end of the contact member, and a spring clip mounted on said force receiving member normally engaging one end of said contact member for holding the said end against the abutment, said clip being adapted to release the end of said contact member from the abutment upon the application of excessive force to the end of said member projecting beyond the force receiving member.

WILLIAM B. HANFORD.
EDWARD B. ERICKSON.